April 21, 1970  R. C. ROBERTS  3,507,068
OTTER BOARD FOR TROLLING
Filed July 30, 1968
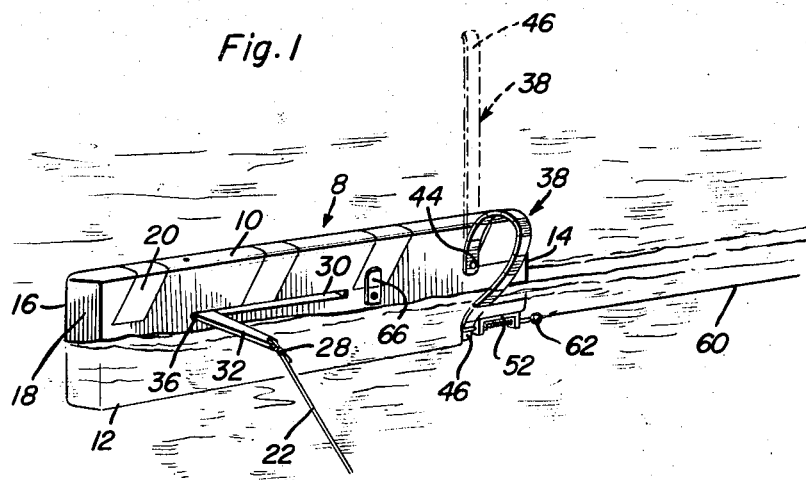
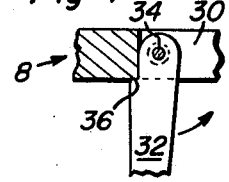
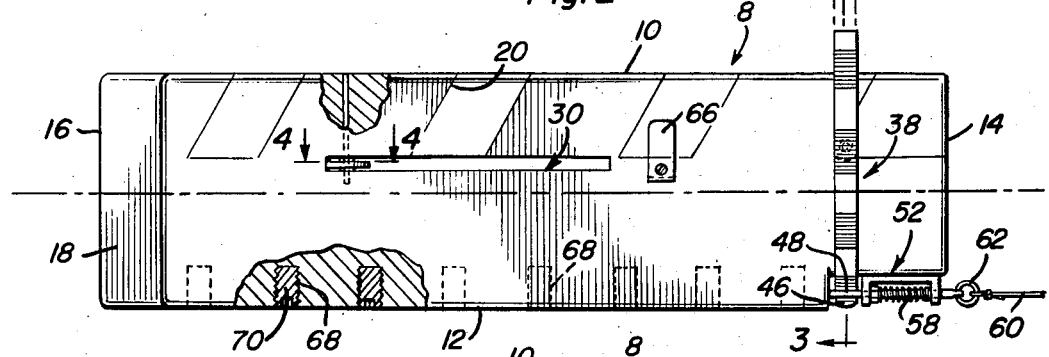
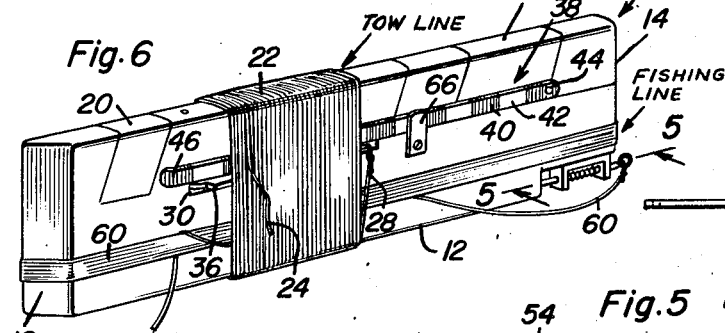
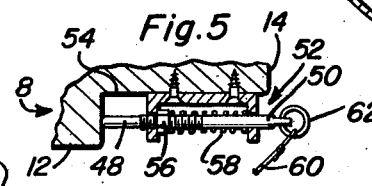
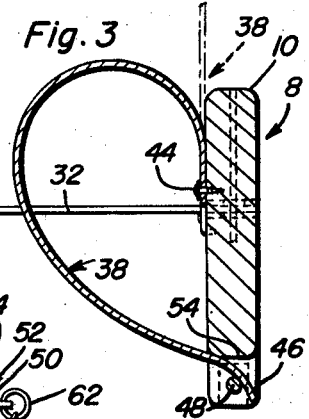
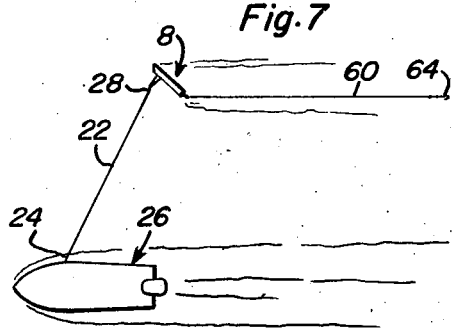
Roy C. Roberts
INVENTOR.
BY *Clarence A. O'Brien*
and *Harvey B. Jacobson*
Attorneys

United States Patent Office 3,507,068
Patented Apr. 21, 1970

3,507,068
OTTER BOARD FOR TROLLING
Roy C. Roberts, Box 688, Washburn, Wis. 54891
Filed July 30, 1968, Ser. No. 748,879
Int. Cl. A01k 93/00, 97/12
U.S. Cl. 43—17                                    9 Claims

ABSTRACT OF THE DISCLOSURE

A distinctively colorful, substantially rectangular otter board is provided with a beveled leading end and provided at a trailing end with a latch pin. The latch pin serves to accommodate a fishing line. It also provides a keeper for an elongate flexibly resilient bite-signalling finger. A towline, independent of the fishing line, is connected at an outer end to an arm which is foldably mounted in a slot provided in a side portion of the otter board.

---

This invention relates to trolling devices which are classified as fishing otters, otter boards and the like and has to do with an innovation which is colorfully decorated, is easy to see from the fishing boat and is equipped with facilities, one of which can be used to operatively connect the towing line, the other one for attachment of the lure-equipped fishing line and which has the additional function of a holddown for a free releasable end portion of a bite-signalling finger which springs up and comes into play when the fish is caught on the fishing line.

Many states, Wisconsin for example, permit each angler to use two lines when trolling for fish. However, when two anglers in one boat troll at the same time it is difficult to keep four lines carried by regular fishing rods from becoming objectionably tangled. The object of the herein disclosed otter trolling board is to enable anglers to cope with and solve the problem in an acceptable manner.

Briefly, the preferred embodiment of the concept invokes the use of a rectangular buoyant pine or an equivalent board approximately 18 inches long and about 8 inches in height (width) and whose leading or forward end is chamfered and thus bevelled from the top lengthwise edge to the bottom lengthwise edge. The bottom edge is loaded with suitable lead weights so that the board stands upright as it is trolled through the water which is being fished. The outer end of a towline or cord is secured to a projectable and retractable adapter arm which, in turn, is pivotally mounted and retracted and folded into a pocketing recess or slot. Because of the bevel, the weighted bottom and the locale and lateral angle of the towline adapter arm, the board is pulled along by the forward motion of the boat and maintains a 45 degree angle relative to the boat. The fishing line is separate from the towline and the forward end is connected with an eye or ring carried by a spring-biased latch pin. This pin is slidingly mounted in a bracket mounted in a notch at the lower corner of the trailing end of the board. The pin is not only pull responsive, the leading end provides a latching detent or keeper for the free lower end of a bendably resilient bite-signalling flag. This flag, like the board, is attractively colorful and normally flexed when set by hand. When the fish strikes the pin it is acted on and the flag automatically snaps up to the desired easy-to-see signalling position shown. Then, too, the flag can be folded down and both lines can be compactly wrapped for handling and storage.

It will be hereinafter evident that when the bite signalling flag pops up above the water's surface the board can and should be retreived, after which the hooked fish can be played free of interference. The signalling flag and latching and retaining pin are so constructed and coordinated that the angler is alerted for best fishing results. The towing line can be payed out and retrieved at will and, being attached to the median body portion of the board by way of a pivoted arm, assures balanced control of the board from the boat. When the device is not being used, the flag can be folded to assume an out-of-the-way position and the fishing line and towline can be neatly wrapped for handling, carrying and compact and convenient storage.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective showing the improved otter board and how it is constructed and trolled and also showing, in phantom lines, the upstanding position of the signalling flag.

FIG. 2 is a view on a suitably enlarged scale with parts broken away and appearing in section and with the towline omitted.

FIG. 3 is an enlarged sectional view taken approximately on the plane of the vertical section line 3—3 of FIG. 2 and showing with particularity how the bite signal or flag is latched in the down position.

FIG. 4 is an enlarged fragmentary detail view with parts in section and elevation taken approximately on the plane of the section line 4—4 of FIG. 2.

FIG. 5 is a similar sectional and elevational view detailing the lower right hand corner portion of the device and taken approximately on the plane of the section line 5—5 of FIG. 6.

FIG. 6 is a view in perspective showing how the folding components are collapsed and how the fishing line and towline can be neatly wrapped at right angles to each other for carrying and storing requirements, and FIG. 7 is a top plan diagrammatic view showing the boat and otter board in use.

The otter board is denoted by the numeral 8 and comprises a rectangular buoyant pine or an equivalent board or panel which is approximately 18 inches long and about 8 inches in height. It has substantially flat or planar inboard and outboard faces. The upper longitudinal edge is denoted at 10, the parallel straight lower longitudinal edge at 12 and the rear or trailing transverse edge at 14. The forward edge is denoted at 16 and it will be noticed that this edge portion is chamfered to provide a bevel 18 which ranges from the bottom edge to the top edge. In actual practice, the over-all surfaces of the board are colorfully painted with waterproof paint (not detailed) and the upper half portion is provided with distinctively colored bands or markers 20. These markers indicate the upper edge and also assist the angler in keeping a watchful eye on the board as it is pulled along by the towing cord or line 22. The inner end of this line (FIG. 7) is denoted at 24 and is controlled from the fishing boat 26. The outer end is denoted at 28 and is attached to the median body portion of the inboard side of the board or panel 8. For best results, the median portion is provided with an elongated slot 30 which provides a pocket or recess for an adapter arm. This arm is denoted at 32 and comprises a suitably-shaped blade which has a rounded end portion pivoted at 34 in one end portion of the accommodation slot 30. A limit stop shoulder can be provided at 36 (FIG. 4) if desired. As a matter of fact, this arm 32 need not necessarily be in tapered blade form. This is to say, it will be within the purview of the invention to substitute a length of rod stock of appropriate cross-sectional gauge for the arm and to pivot it in place in the same manner as suggested in FIG. 4.

Attention is now directed to the bite signal 38. This comprises a flexible resilient so-called signalling flag. More specifically, it comprises a length of flexible and resilient metal or plastic strap. This strap is provided with alternating white and colored blocks 40 and 42, thus providing the desired striped effect. One end portion is pivoted at 44 on the median rear part of the inboard surface of the otter board 8 as perhaps best shown in FIG. 6. The free end 46 is flared or deflected and provides a satisfactory catch as shown in FIGURE 3. When the flag is being used, the tip end 46 is engaged with a keeper 48 constituting an end portion of a latch pin 50 (FIG. 5). This latch pin is slidingly mounted in the apertured arms of a U-shaped bracket 52 which is fastened in a notch 54 provided therefor in the lower right hand corner portion in the manner shown. There is an assembling and stop nut at 56 and a coil spring at 58 which is confined in the bracket. The spring serves to press the latch end to assume a latching position in a manner to hold the bite-signalling flag in the down position shown in FIG. 3. The fishing line is denoted at 60 and is connected by a ring or eye 62 to the spring-biased pin 50. It follows that when the fish strikes the hook 64 (FIG. 7) the responsive spring-loaded pin comes into play and releases the trippable end of the flag. Then the flag swings up to the phantom line signalling position shown in FIGS. 1, 2 and 3 in particular.

When not in use, the fishing line and towline can be wrapped around the surfaces of the board as shown in FIG. 6. Also, the flag can be held in a down out-of-the-way of a retaining clip 66. At this stage, the arm 32 is folded into the slot 30 to assume and out-of-the-way position.

A consideration of the views of the drawing particularly FIGS. 1, 6 and 7 will clarify the construction.

In actual practice, the lower edge portion is provided with recesses or sockets 68 to accommodate lead weights or the like 70.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. For use when trolling from a boat, an elongated buoyant otter board having horizontal upper and lower longitudinal edges and vertical forward and rearward edges transverse to and joining said upper and lower edges, a bite signal comprising an elongated strip member, a fishing line, pull-responsive means for the fishing line carried by a rearward portion of said otter board, said means having an eye to which a forward end of the fishing line is tied and thus operatively connected, said bite signal having one end fastened in a given place on a surface of said otter board and a free end releasably connected with said pull-responsive means, a remote controlled towing line having inner and outer ends, and means connecting an outer end of said towing line to a median body portion of said otter board, the inner end of said towing line being adapted to be caught hold of and manipulated by a fisherman in said boat.

2. The otter board defined in and according to claim 1 and wherein said vertical leading end is chamfered in a manner to provide a rearwardly sloping bevel, said bevel being of a length that it ranges from the upper edge to the lower edge of said otter board.

3. The otter board defined in and according to claim 1, and wherein said bite signal is of a length proportional to the length and width of said otter board and has inherent flexible and resilient properties, said one end of said strip member being pivotally anchored, the other end being free and permitting said strip member to be longitudinally manually flexed and bowed between its ends in such a manner that the free end can be aligned and releasably connected with said pull-responsive means whereby when the pull-responsive means is tripped by a pull exerted by a fish on said fishing line, the strip member automatically springs from its set bowed position to an upstanding tell-tale signalling position above the upper edge of said otter board.

4. The otter board defined in and according to claim 1, and wherein the means connecting the outer end of the aforementioned towline to said body portion comprises a projectable and retractable arm, said arm having an end pivotally joined to said body portion, said body portion having a recess commensurate in length with the length of said arm, said recess providing a pocket, said end of said arm being pivoted in an end portion of the recess and said arm being foldable into said pocket when stored and not in use.

5. The otter board defined in and according to claim 1, and wherein said pull-responsive means comprises a bracket and a spring-loaded latch pin slidingly mounted in said bracket, said eye provided at a rearward end of said latch pin, the forward end of said latch pin providing a keeper-like detent and the free end of said bite signal being flexibly resilient and releasably engageable with said detent.

6. The otter board defined in and according to claim 5, and wherein the lower edge portion of said otter board is provided with distributively arranged weights, whereby when the board is in use it can be trolled along in a substantially vertically forwardly riding position.

7. For use when trolling, an elongated buoyant otter board, said board being substantially rectangular, having spaced parallel upper and lower longitudinal edges joined at forward and rearward ends by transverse leading and trailing edges, the leading edge being beveled from the lower longitudinal edge to the upper longitudinal edge, said otter board being coated with paint and an upper half portion thereof being provided with distinguishable markers to enable the fisherman in the boat to maintain the otter board in a generally vertical trolling position, a rearward lower corner portion of said board having a notch, a bracket mounted within the confines of said notch, a forward end of said bracket being spaced from an adjacent rearward end of the notch to provide a predetermined space, a spring-loaded latch pin slidingly mounted in said bracket and having a forward end engaging a coacting forward end of the notch and providing a keeper, the rearward end of said pin being provided with an eye, a fishing line having an end connected to said eye, a relatively-long colorfully-marked strip member having an end portion pivotally mounted on an inboard surface of the rearward end of said otter board, said strip member providing a signalling arm and being flexible and resilient and normally having a bendable free end which is latched in place and trippably and releasably held by the keeper portion of said latch pin, a clip mounted on said inboard surface and into which said free end of said signalling strip member can be folded when the device is not being used.

8. The otter board defined in and according to claim 7 and wherein a median portion of the body part of said otter board is provided with a recess defining a pocket, an arm having one end pivotally mounted in said pocket and located at a forward end portion of the pocket, said arm when not in use being foldable into said pocket, said arm having an outer free end to which a towline is detachably connectible.

9. The otter board defined in and according to claim 7 and wherein a median portion of the body part of said otter board is provided with a recess defining a pocket, an arm having one end pivotally mounted in said pocket and located at a forward end portion of the pocket, said arm when not in use being foldable into said pocket, said arm having an outer free end to which a towline is detachably connectible, and the lower marginal edge of said otter board being provided with sockets and said sockets being provided with insertable and removable weights, said weights being distributively arranged in a manner to facilitate maintaining said otter board in a substantially vertical traveling position when trolling.

References Cited

UNITED STATES PATENTS

| | | | |
|---|---|---|---|
| 270,358 | 1/1883 | Aldrich | 43—17 |
| 594,609 | 11/1897 | Dodge | 43—17 |
| 885,627 | 4/1908 | Loehr | 43—17 |
| 1,081,837 | 12/1913 | Jordan | 43—43.13 |
| 1,227,300 | 5/1917 | Oberg | 43—43.13 |
| 2,235,236 | 3/1941 | Ramseier | 43—43.13 |
| 2,565,379 | 8/1951 | Laurila | 43—17 |
| 2,654,176 | 10/1953 | Kachelski et al. | 43—17 |
| 2,825,994 | 3/1958 | Bruhn | 43—43.13 |

ALDRICH F. MEDBERY, Primary Examiner

D. J. LEACH, Assistant Examiner

U.S. Cl. X.R.

43—43.13